United States Patent Office 3,351,971
Patented Nov. 14, 1967

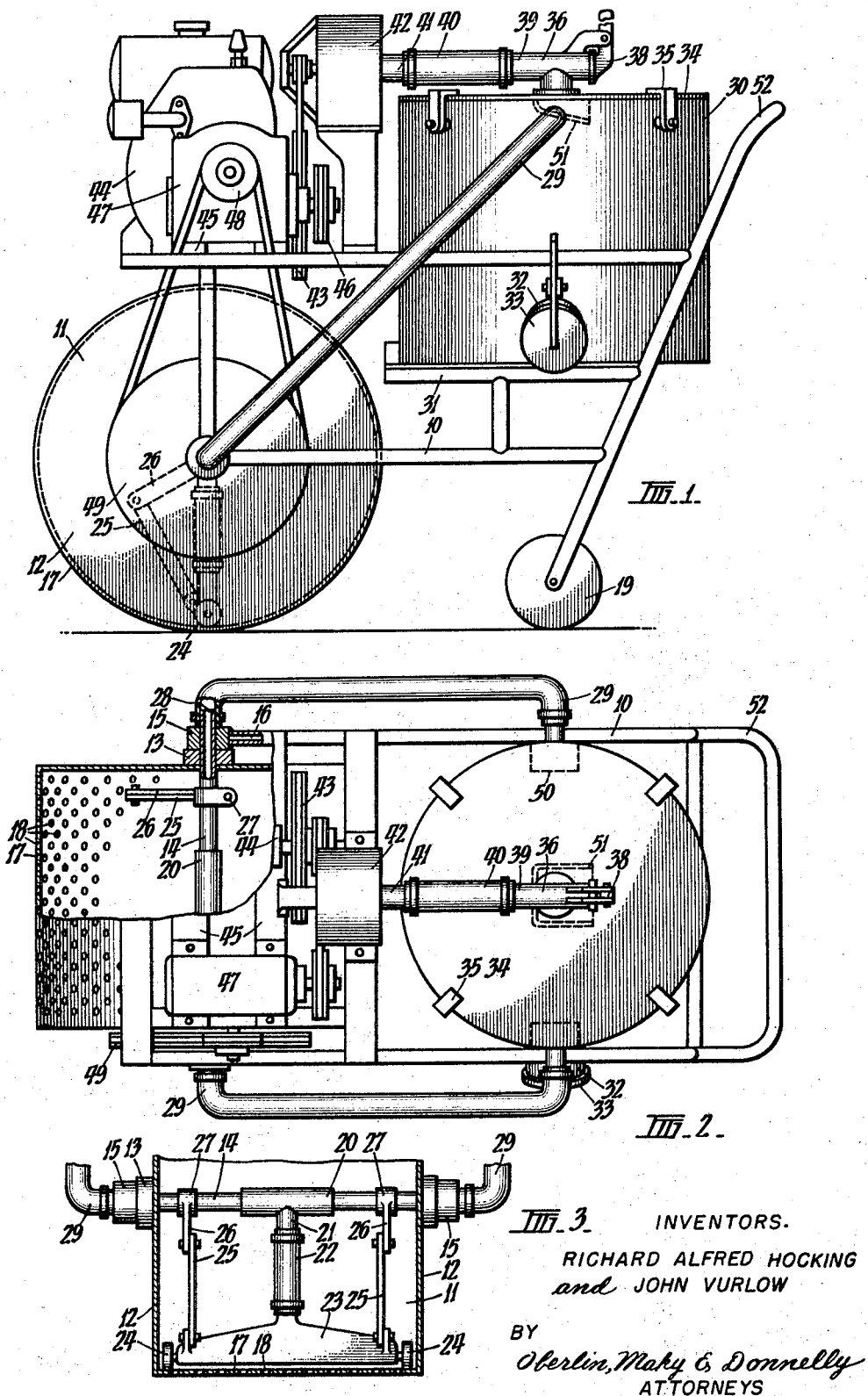

3,351,971
APPARATUS FOR REMOVING EXCESS MOISTURE
FROM THE GROUND AND OTHER SURFACES
Richard Alfred Hocking, 15 Churchill Way, Kilsyth, Victoria, and John Vurlow, 109 Marrianne Way, Mount Waverly, Victoria, Australia
Filed Apr. 27, 1965, Ser. No. 451,268
Claims priority, application Australia, Apr. 28, 1964, 43,747/64
6 Claims. (Cl. 15—340)

This invention relates to apparatus for removing excess moisture from the ground and other surfaces and is particularly, though not specifically, for use in removing excess moisture from sports arenas or like playing grounds.

The removal of excess moisture, such as rain water, from a cricket pitch or other sports or playing arenas presents considerable difficulty and one of the present practices is to employ a large sponge roller to absorb excess moisture from the playing arena, however, this method has limitations in application and the amount of moisture that can be removed.

The principal object of the present invention is to provide an apparatus for removing excess moisture from the ground and other surfaces which will be more convenient and efficient in operation and wider in application than those at present employed.

According to the present invention, apparatus for removing excess moisture from the ground and other surfaces broadly includes a mobile frame, a perforated member mounted on said frame and arranged for movement over and in contact with the ground and other surfaces to permit moisture to pass therethrough, moisture collecting means mounted on one side of said member to remove moisture passed through the member, a tank carried on said frame and connected to the moisture collecting means, and suction generating means connected to the tank and moisture collecting means to deliver collected moisture to said tank.

In order that the invention may be more readily understood reference will now be made to the accompanying drawings illustrating an apparatus for removing excess water from the ground, particularly a sports arena, constructed in accordance with the present invention. In these drawings:

FIG. 1 is a side elevation of the apparatus;
FIG. 2 is a plan view, partly in section, and
FIG. 3 is a sectional detail of the suction nozzle mounting within the roller.

As illustrated the apparatus comprises a tubular metal frame 10 supported at its forward end on a rotatably mounted hollow cylindrical roller 11. The end walls 12 of the roller 11 are provided with bearings 13 which provide for free rotation of the roller about a hollow shaft 14 forming an axle for said roller. The ends of the hollow shaft 14 are fixed in bosses 15 provided in lower side members 16 of the frame 10. The cylindrical wall 17 of the roller 11 is of relatively thin sheet metal and is perforated as at 18 around the whole of its circumference, said roller 11 providing a ground engaging support for the forward end of the frame 10 which is also provided with one or more trailing wheels 19 to support the rear end of the frame.

As shown in FIG. 3 the hollow shaft 14 is provided with a T-piece 20, the center arm 21 of which is connected by a flexible conduit 22 to a suction nozzle 23 positioned within the roller 11. The nozzle 23 is suspended by the conduit 22 so that the nozzle extends across the roller parallel to the shaft 14 and adjacent to the inner side of the perforated wall 17 of the roller. The ends of the nozzle are supported on wheels 24 which during rotation of the roller 11 engage the inner surface of the wall 17 of the roller to maintain the nozzle 23 a short distance above the said inner surface of the roller opposite its point of contact with the ground.

The ends of the nozzle 23 are connected through links 25 which are pivoted to the ends of downwardly and forwardly inclined arms 26 which at their inner ends 27 are clamped to the shaft 14. This arrangement enables the nozzle 23 to swing rearwardly clear of the inner surface of the wall 17 of the roller 11 should any foreign body enter the roller through a perforation 18 to thereby prevent damage to the nozzle or its mounting.

Extending ends 28 of the axle shaft 14 are each connected by conduits 29 to the upper end of a moisture receiving tank 30 carried on a sub-frame 31 of the main frame 10 rearwardly of the roller 11. The lower end of the tank 30 has a discharge pipe 32 with a manually operable valve 33 therein to enable moisture collected in the tank to be discharged where and when required.

The top 34 of the tank 30 is removable and is retained in position by a plurality of suitable clamps or clips 35. A T-pipe 36 is connected to the tank top 34, one arm of the pipe 36 having a manually operated flap valve 38 arranged to normally close said arm while the other arm 39 is connected by a conduit 40 to the suction pipe 41 of a suction fan 42, preferably a multi-stage fan, which is drive coupled by belt and pulley drive 43 to an internal combustion engine 44 supported on a transverse frame 45. An electric motor may be used in lieu of the internal combustion engine if so required.

The engine 44 is also drive coupled by belt and pulley drive 46 to a reduction gear box 47 the output shaft of which has a V-belt pulley 48 thereon for driving a pulley 49 mounted on one end of the roller 11 so that the apparatus is self-propelled.

Baffles 50 are preferably provided over the entrance apertures of the conduits 29 into the tank 30 so as to direct moisture downwardly into the tank. A baffle 51 is also provided over the suction inlet to the tank to prevent the moisture entering the tank from being passed to the fan 42.

In operation the roller 11 is directed, under control by handle bar 52 forming part of frame 10, over the ground or area from which it is desired to remove excess moisture and such moisture entering the roller through the perforations 18 is drawn, by operation of the fan 42, through the nozzle 23 into the hollow axle 14 and passed through the transfer conduits 29 and delivered into the tank 30. To discharge collected moisture from the tank 30, the vacuum release valve 38 is opened and then the moisture discharge valve 33 for release of the moisture from the tank. The opening of valve 38 admits atmospheric air to the tank and to the fan to cut off the suction to the tank and the nozzle in the roller.

In a modified construction the perforated roller is replaced by a perforated plate or strip which is supported on the frame so that the underside of the plate or strip is in contact with the surface from which moisture is to be removed. The nozzle extends across the inside of the plate or strip to remove the moisture passing through the apertures in the plate or strip. In this modified arrangement two ground engaging wheels are provided on the frame to support the frame and provide mobility therefor.

We claim:

1. Apparatus for removing excess moisture from the ground and other surfaces comprising a mobile frame, a hollow ground engaging roller rotatably mounted on said frame to support the latter and having perforations in the circumferential wall thereof to admit such moisture into said roller at its point of ground contact, a moisture collecting nozzle supported adjacent the opposite side of such perforated wall, a tank carried by said frame, suction generating means for drawing such moisture passing through said perforated wall into said nozzle and delivering such moisture to said tank, and roller means on said nozzle for supporting said moisture collecting nozzle in rolling contact with said roller adjacent said perforated wall along such point of ground contact.

2. Apparatus for removing excess moisture from the ground and other surfaces including a mobile frame, a hollow ground engaging roller supporting said frame, an axle fixed to said frame on which said roller is rotatably mounted, perforations in the circumferential wall of said roller to admit moisture into said roller, a moisture collecting nozzle, means mounting said nozzle within said roller for free swinging movement adjacent the wall of said roller to preclude damage to said nozzle by any foreign body entering said roller through such perforations, said nozzle mounting means comprising a pair of arms projecting downwardly from said axle, and links pivotally connecting said nozzle to the lower ends of said arms, a tank carried by said frame, and suction generating means for drawing moisture within said roller into said nozzle and delivering such moisture to said tank.

3. Apparatus for removing excess moisture from the ground and other surfaces including a mobile frame, a hollow ground engaging roller supporting one end of said frame, means carried by said frame for rotatably supporting said roller, said roller being formed with perforations in the circumferential wall thereof to admit moisture into the interior of said roller, moisture collecting nozzle means mounted in the interior of said roller, means mounting said nozzle means within said roller for movement of said nozzle means relative to the mounting thereof and relative to said circumferential wall of said roller, the inlet end of said nozzle means terminating relatively adjacent said circumferential wall of said roller in the region thereof contacting the ground, a tank carried by said frame, and suction generating means operatively connected to said nozzle means for drawing moisture within said roller into said nozzle means and delivering such moisture to said tank.

4. The apparatus of claim 3 wherein said suction generating means comprises a power operated suction fan connected to said tank and to said nozzle means to deliver moisture collected by said nozzle means into said tank and further comprising a drive coupling between said power for operating said suction fan and said roller to provide propulsion of the apparatus.

5. The apparatus of claim 3 further comprising roller means on said nozzle means for maintaining rolling contact between said nozzle means and roller wall.

6. The apparatus of claim 3 wherein said nozzle mounting means comprises a pair of arms projecting downwardly from said axle, and links pivotally connecting said nozzle means to the lower ends of said arms.

References Cited
UNITED STATES PATENTS

| 1,176,990 | 3/1916 | Scherff | 15—320 |
| 2,784,652 | 3/1957 | Hornbostel. | |
| 3,147,509 | 9/1964 | Sieb | 15—562 X |

FOREIGN PATENTS 942,338   11/1963   Great Britain.

ROBERT W. MICHELL, *Primary Examiner.*